(12) United States Patent
Trossen et al.

(10) Patent No.: US 11,438,440 B2
(45) Date of Patent: Sep. 6, 2022

(54) AD-HOC LINK-LOCAL MULTICAST DELIVERY OF HTTP RESPONSES

(71) Applicant: IDAC HOLDINGS, INC., Wilmington, DE (US)

(72) Inventors: Dirk Trossen, London (GB); Sebastian Robitzsch, London (GB)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/627,649

(22) PCT Filed: Jun. 18, 2018

(86) PCT No.: PCT/US2018/038016
§ 371 (c)(1),
(2) Date: Dec. 30, 2019

(87) PCT Pub. No.: WO2019/005519
PCT Pub. Date: Jan. 3, 2019

(65) Prior Publication Data
US 2020/0162573 A1    May 21, 2020

Related U.S. Application Data

(60) Provisional application No. 62/527,104, filed on Jun. 30, 2017.

(51) Int. Cl.
*G06F 15/16* (2006.01)
*H04L 67/566* (2022.01)
(Continued)

(52) U.S. Cl.
CPC ........ *H04L 67/566* (2022.05); *H04L 61/5069* (2022.05); *H04L 67/02* (2013.01)

(58) Field of Classification Search
CPC . H04L 67/2833; H04L 61/2069; H04L 67/02; H04L 67/32; H04L 12/18; G06F 16/95
(Continued)

(56) References Cited

U.S. PATENT DOCUMENTS 8,249,068 B2    8/2012  Bijwaard et al.
8,516,081 B2    8/2013  Kunito et al.
(Continued)

FOREIGN PATENT DOCUMENTS

CN         103916253 A      7/2014
EP           1617591 A1     1/2006
(Continued)

OTHER PUBLICATIONS

Cisco, "IP Multicast Technology Overview," DIG: Enterprise Campus Technology (Apr. 18, 2002) available at https://www.cisco.com/c/en/us/td/docs/ios/solutions_docs/ip_multicast/White_papers/mcst_ovr.html (last visited Mar. 24, 2020).
(Continued)

*Primary Examiner* — Cheikh T Ndiaye
*Assistant Examiner* — Ayele F Woldemariam
(74) *Attorney, Agent, or Firm* — Volpe Koenig

(57) ABSTRACT

A Network Access Point (NAP) in an ICN may have multiple clients requesting the same resource. Instead of sending multiple link-local unicast transmissions, the multiple clients may subscribe to a response bucket based on their unicast address and the NAP may send a multicast response to the group based on previously issued HTTP requests. The response bucket may contain multiple clients attached to the NAP. A multicast address of the response bucket may be used by the NAP to send the multicast response. A class D octet in the multicast group address may be derived from a class C octet of the individual client IP addresses.

20 Claims, 11 Drawing Sheets

(51) Int. Cl.
*H04L 67/02* (2022.01)
*H04L 61/5069* (2022.01)

(58) Field of Classification Search
USPC .......................................................... 709/245
See application file for complete search history.

(56) References Cited

U.S. PATENT DOCUMENTS

| | | | |
|---|---|---|---|
| 8,584,170 | B2 | 11/2013 | Park et al. |
| 8,804,591 | B2 | 8/2014 | Lu et al. |
| 9,363,227 | B2 | 6/2016 | Wijnands et al. |
| 9,660,825 | B2 | 5/2017 | Garcia-Luna-Aceves |
| 10,122,632 | B2 | 11/2018 | Trossen et al. |
| 2007/0097993 | A1* | 5/2007 | Bojahra ................. H04L 41/00 370/401 |
| 2009/0279520 | A1* | 11/2009 | Maki ..................... H04W 12/06 370/338 |
| 2010/0299707 | A1* | 11/2010 | Kim ....................... H04L 67/16 725/51 |
| 2011/0103374 | A1* | 5/2011 | Lajoie ................. H04L 65/4076 370/352 |
| 2011/0299529 | A1 | 12/2011 | Olsson et al. |
| 2013/0173822 | A1* | 7/2013 | Hong .................... H04L 67/327 709/232 |
| 2014/0173135 | A1* | 6/2014 | Varney ................. H04L 67/2842 709/245 |
| 2016/0330165 | A1* | 11/2016 | Jeanne .................... H04L 43/12 |
| 2017/0118311 | A1* | 4/2017 | Frydman ................. H04L 67/42 |
| 2018/0007116 | A1 | 1/2018 | Trossen |

FOREIGN PATENT DOCUMENTS

| | | |
|---|---|---|
| EP | 2 242 266 | 10/2010 |
| WO | 2016/123516 | 8/2016 |
| WO | 2016/201411 | 12/2016 |
| WO | 2017/100543 | 6/2017 |
| WO | 2018/006042 | 1/2018 |

OTHER PUBLICATIONS

Holbrook et al., "Using Internet Group Management Protocol Version 3 (IGMPv3) and Multicast Listener Discovery Protocol Version 2 (MLDv2) for Source-Specific Multicast," Network Working Group, RFC 4604 (Aug. 2006).

IEEE Standard for Information technology—Telecommunications and information exhange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exhange between systems—Local and metropolitan are networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Jacobson et al., "Networking Named Content," CoNEXT Proceedings of the 5th Internet Conference on Emerging Networking Experiments and Technologies, Rome, Italy, pp. 1-12 (2009).

Trossen et al., "Designing and Realizing an Information-centric Internet," IEEE Communications Magazine, vol. 50, No. 7 (Jul. 2012).

Liang, "Research and Implementation of Information Transmission Scheme Based on the Technology of ICN," Master Thesis, University of Electronic Science and Technology of China (Mar. 15, 2016).

Ravindran et al., "Information-centric Networking Based Homenet," 2013 IFIP/IEEE International Symposium on Integrated Network Management (Aug. 1, 2013).

Xia et al., "Survey of Information-Centric Networking," Journal of Frontiers of Computer Science and Technology (May 13, 2013).

Zegn, "Implementation of IP Multicast Technology and Application System," Academic Journal of University of Jiangxi Radio and Television (Sep. 30, 2004).

* cited by examiner

AD-HOC LINK-LOCAL MULTICAST DELIVERY OF HTTP RESPONSES

CROSS REFERENCE TO RELATED APPLICATIONS

This application is the U.S. National Stage, under 35 U.S.C. § 371, of International Application No. PCT/US2018/038016 filed Jun. 18, 2018, which claims the benefit of U.S. Provisional Application No. 62/527,104 filed on Jun. 30, 2017, the contents of which are hereby incorporated by reference herein.

BACKGROUND

In wireless communication there are instances where it may be useful to have many devices retrieve the same content and control the reception of the content individually. Wireless and wired protocols may be used to enable the receipt of this content such that the least burden is placed on the infrastructure and the process is efficient for the end user device.

SUMMARY

Methods, systems, and apparatuses for delivering a single Hypertext Transfer Protocol (HTTP) response to multiple clients using extended Internet Protocol (IP) multicast are disclosed. A first network access point (NAP) may assign an IP address to a client that has attached to the NAP. The first NAP may receive an Internet Group Management Protocol (IGMP) message from the client to join a multicast address associated with a response bucket that contains multiple clients attached to the first NAP. A class D octet in the multicast address may be a class C octet of the client's IP address. The first NAP may receive a Hypertext Transfer Protocol (HTTP) request from the client. The first NAP may publish the HTTP request to a second NAP. The published HTTP request may include a content identifier (CID). The first NAP may receive an HTTP response from the second NAP. The HTTP response may include a reverse CID (rCID). The first NAP may determine that the client and one or more of the multiple clients are awaiting the HTTP response. The first NAP may send a multicast response to a bucket of clients (identified by an IP multicast address) containing the HTTP response to the multicast address. The multicast response may include a group ID field in an IP header indicating that the client is to extract the response.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
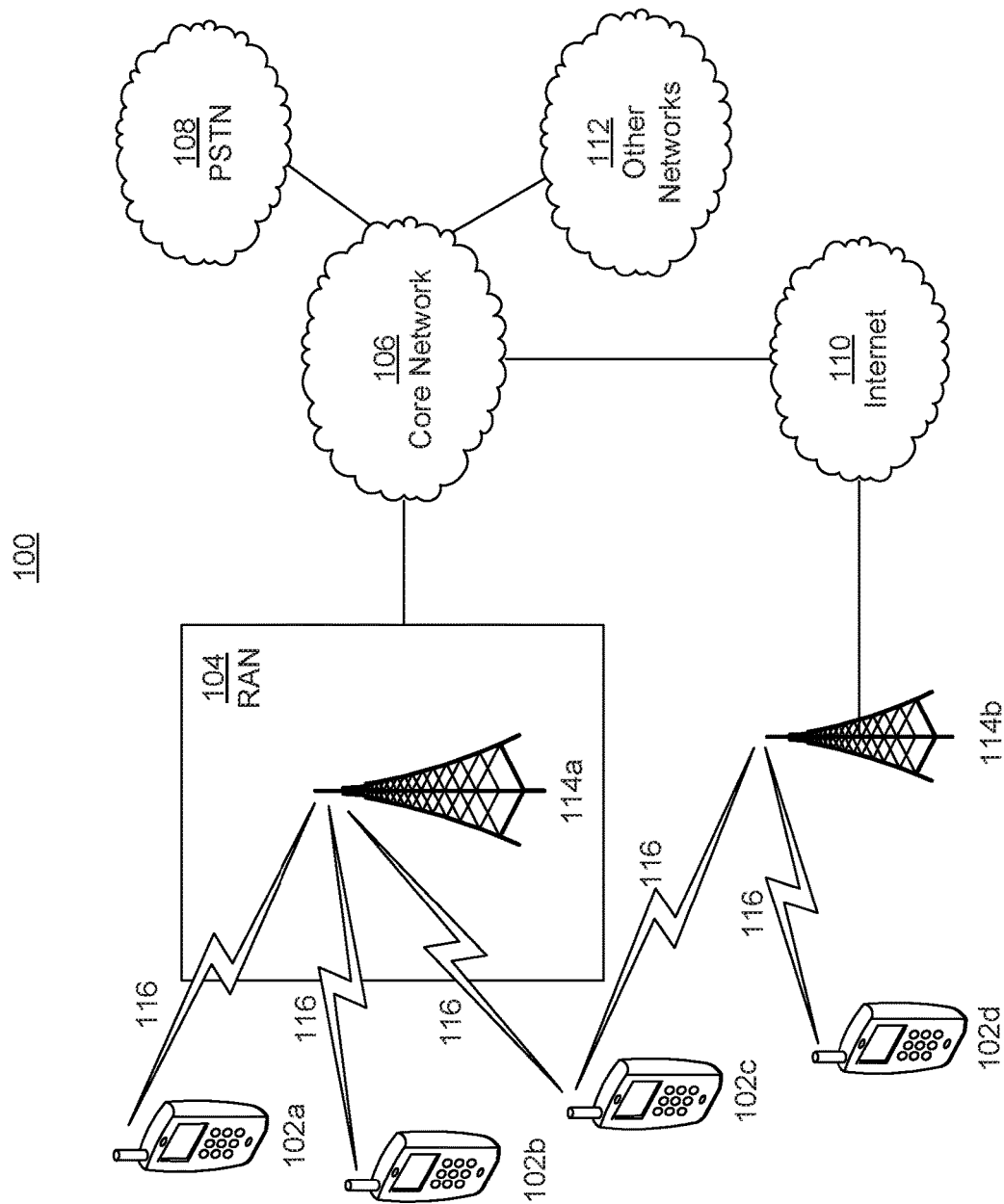
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
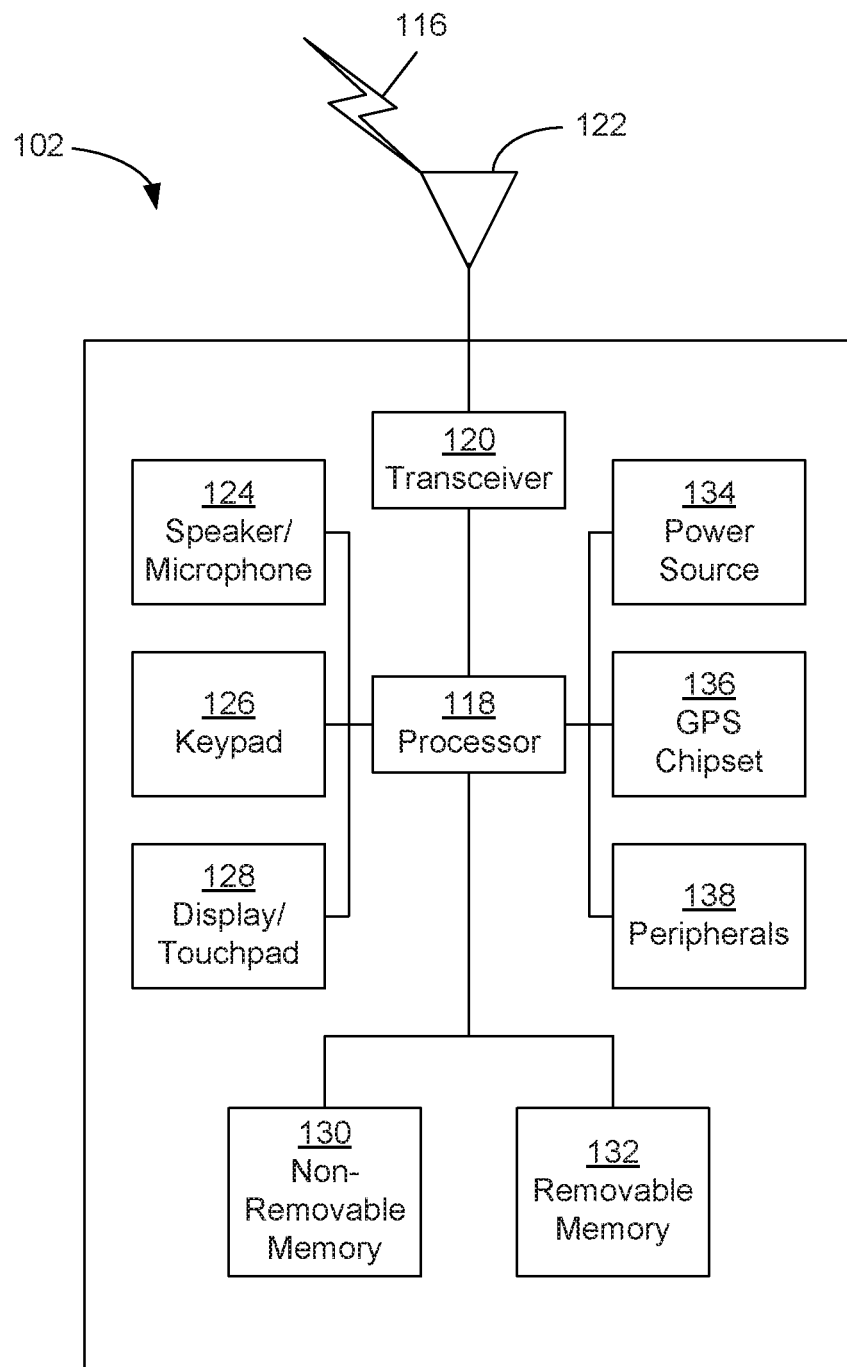
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
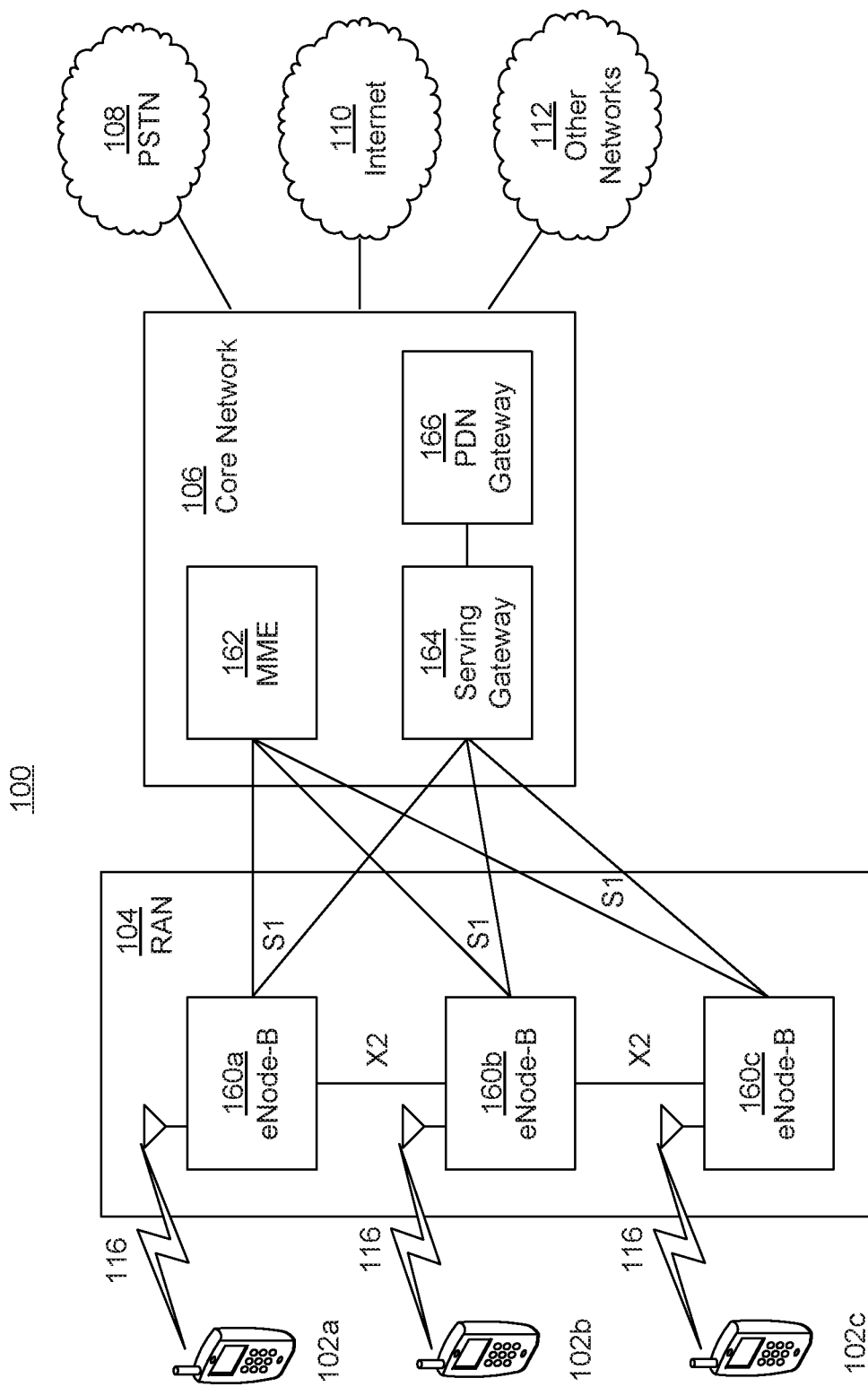
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
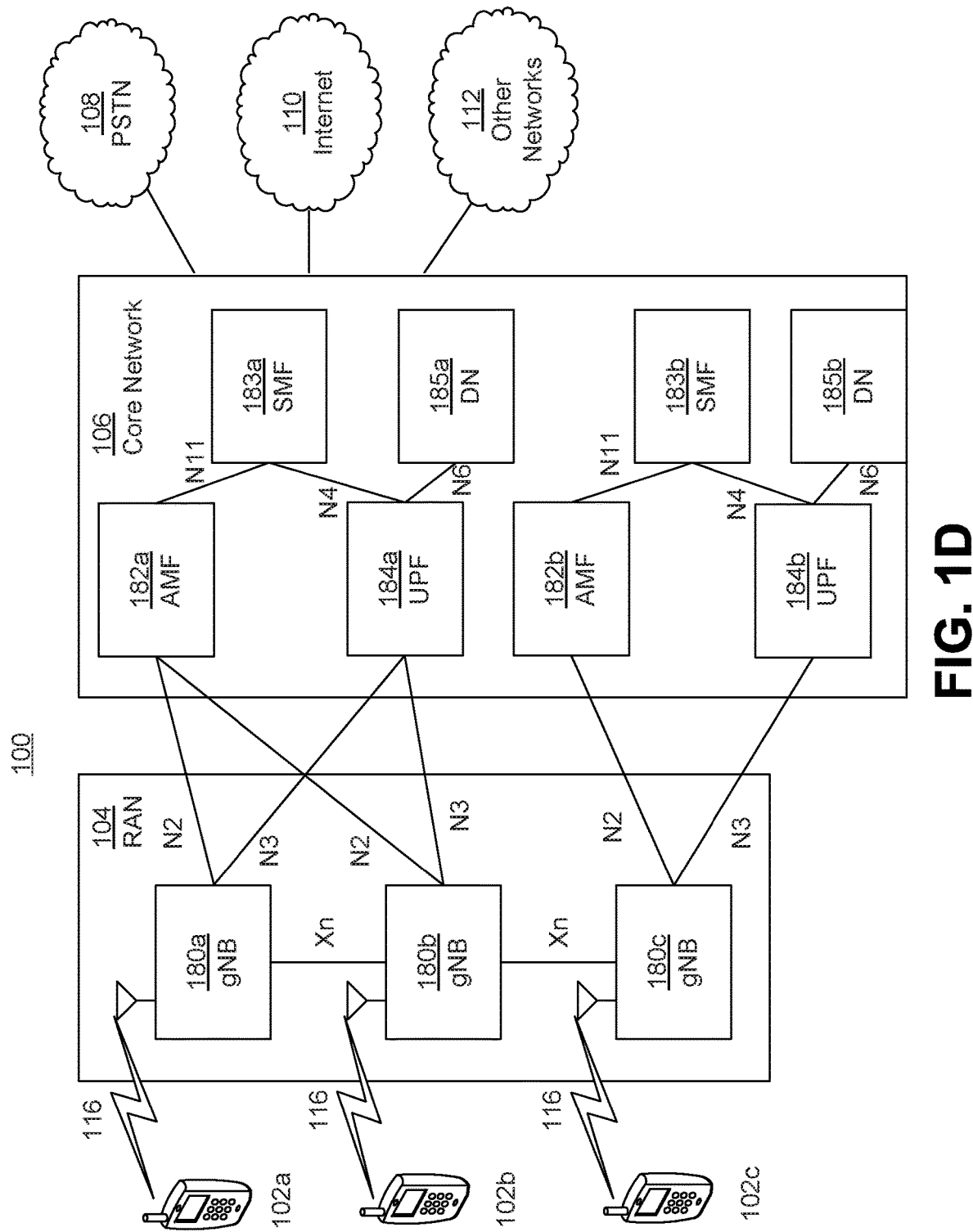
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 1E:
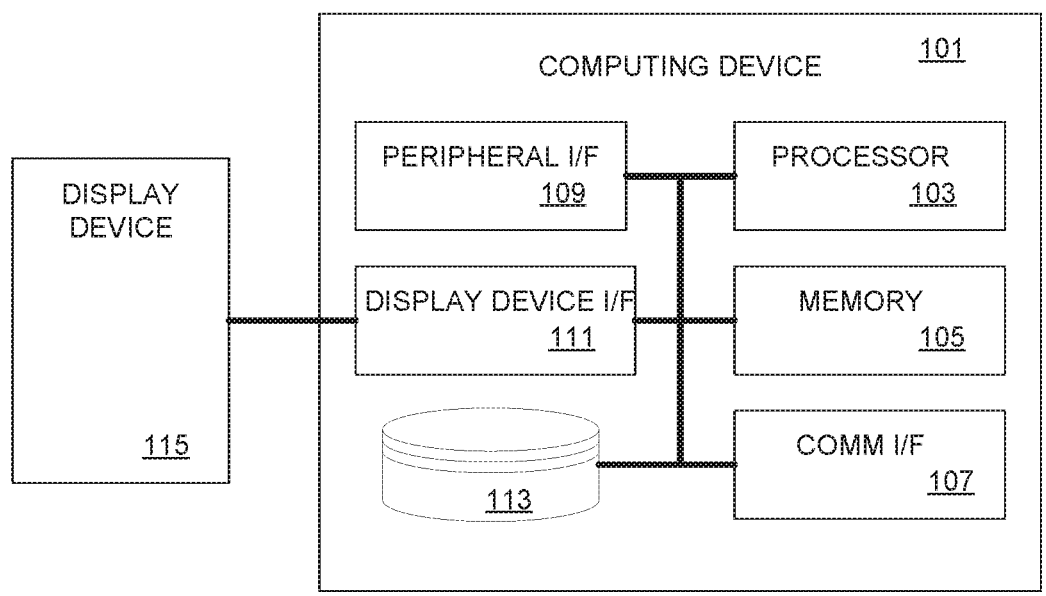
FIG. 1E is component diagram of a computing device.

Referring now to FIG. 1E, an example computing device 101 is shown. The computing device 101 may be implemented in the clients described below. The computing device 101 may include a processor 103, a memory device 105, a communication interface 107, a peripheral device interface 109, a display device interface 111, and a storage device 113. FIG. 1E also shows a display device 115, which may be coupled to or included within the computing device 101.

The memory device 105 may be or include a device such as a Dynamic Random Access Memory (D-RAM), Static RAM (S-RAM), or other RAM or a flash memory. The storage device 113 may be or include a hard disk, a magneto-optical medium, an optical medium such as a CD-ROM, a digital versatile disk (DVDs), or Blu-Ray disc (BD), or other type of device for electronic data storage.

The communication interface 107 may be, for example, a communications port, a wired transceiver, a wireless transceiver, and/or a network card. The communication interface 107 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 109 may be an interface configured to communicate with one or more peripheral devices. The peripheral device interface 109 may operate using a technology such as Universal Serial Bus (USB), PS/2, Bluetooth, infrared, serial port, parallel port, and/or other appropriate technology. The peripheral device interface 109 may, for example, receive input data from an input device such as a keyboard, a mouse, a trackball, a touch screen, a touch pad, a stylus pad, and/or other device. Alternatively or additionally, the peripheral device interface 109 may communicate output data to a printer that is attached to the computing device 101 via the peripheral device interface 109.

The display device interface 111 may be an interface configured to communicate data to display device 115. The display device 115 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 111 may operate using technology such as Video Graphics Array (VGA), Super VGA (S-VGA), Digital Visual Interface (DVI), High-Definition Multimedia Interface (HDMI), or other appropriate technology.

The display device interface 111 may communicate display data from the processor 103 to the display device 115 for display by the display device 115. As shown in FIG. 1E, the display device 115 may be external to the computing device 101, and coupled to the computing device 101 via the display device interface 111. Alternatively, the display device 115 may be included in the computing device 101.

An instance of the computing device 101 of FIG. 1E may be configured to perform any feature or any combination of features described above. In such an instance, the memory device 105 and/or the storage device 113 may store instructions which, when executed by the processor 103, cause the processor 103 to perform any feature or any combination of features described above. Alternatively or additionally, in such an instance, each or any of the features described above may be performed by the processor 103 in conjunction with the memory device 105, communication interface 107, peripheral device interface 109, display device interface 111, and/or storage device 113.

Although FIG. 1E shows that the computing device 101 includes a single processor 103, single memory device 105, single communication interface 107, single peripheral device interface 109, single display device interface 111, and single storage device 113, the computing device may include multiples of each or any combination of these components 103, 105, 107, 109, 111, 113, and may be configured to perform, mutatis mutandis, analogous functionality to that described above.

Figure 1F:
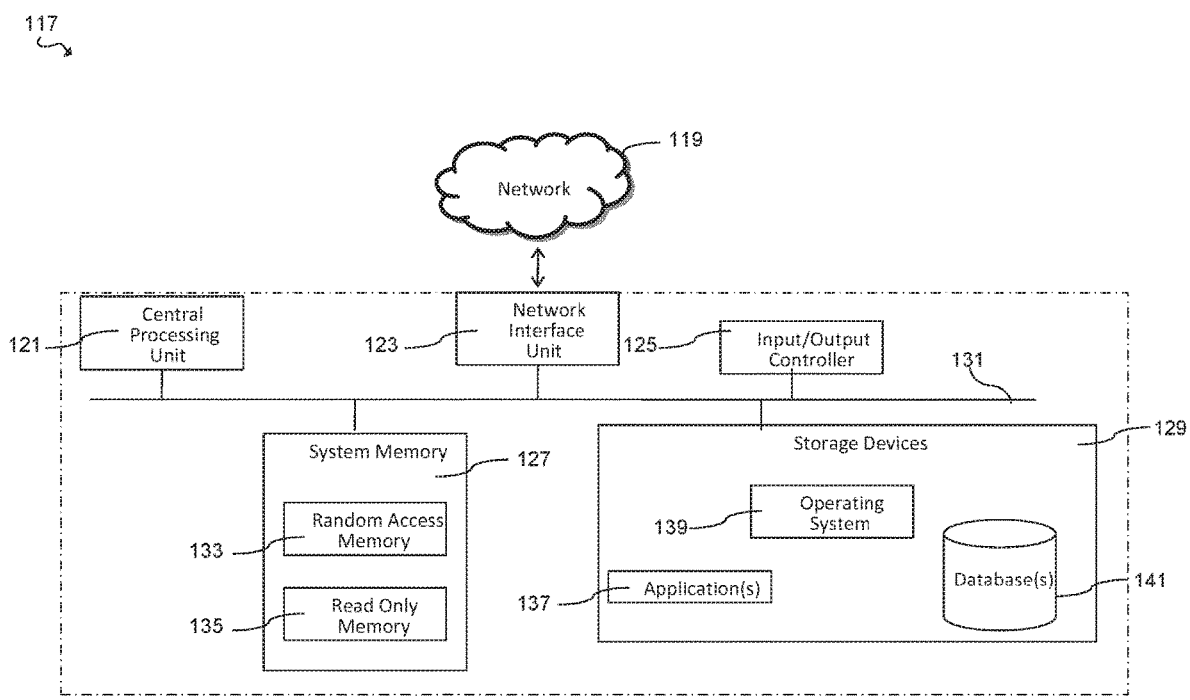
FIG. 1F is a component diagram of a server.

Referring now to FIG. 1F, a component diagram of a server 117 is shown. The server 117 may be a conventional stand-alone web server, a server system, a computing cluster, or any combination thereof. The server 117 may include a server rack, a data warehouse, network, or cloud type storage facility or mechanism that is in communication with a network 119. The server 117 may include one or more central processing units (CPU) 121, network interface units 123, input/output controllers 125, system memories 127, and storage devices 129. Each CPU 121, network interface unit 123, input/output controller 125, system memory 127, and storage devices 129 may be communicatively coupled via a bus 131.

The system memory 127 may include random access memory (RAM) 133, read only memory (ROM) 135, and one or more cache. The storage devices 129 may include one or more applications 137, an operating system 139, and one or more databases 141. The one or more databases 141 may include a relational database management system managed by Structured Query Language (SQL). The storage devices 129 may take the form of, but are not limited to, a diskette, hard drive, CD-ROM, thumb drive, hard file, or a Redundant Array of Independent Disks (RAID).

The server 117 may be accessed by the clients, as described below, via a network 119 using a mainframe, thin client, personal computer, mobile device, pad computer, or the like. Information processed by the CPU 121 and/or operated upon or stored on the storage devices 129 and/or in the system memory 127 may be displayed to a client through a user device.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

An information-centric network (ICN) is a system where content/data/information is exchanged by means of information addressing, while connecting appropriate networked entities that are suitable to act as a source of information towards the networked entity that requested the content.

In some architectures of ICN, at least some existing network infrastructure may be replaced in order to realize desired network-level functions of ICN solutions. Migration scenarios from existing network infrastructure to ICN may be realized as an overlay over existing architectures (e.g., IP-based architectures using Hypertext Transfer Protocol (HTTP) or local Ethernet-based architectures). Such migration, however, may require the transition of WTRUs to an ICN-based solution.

Figure 2:
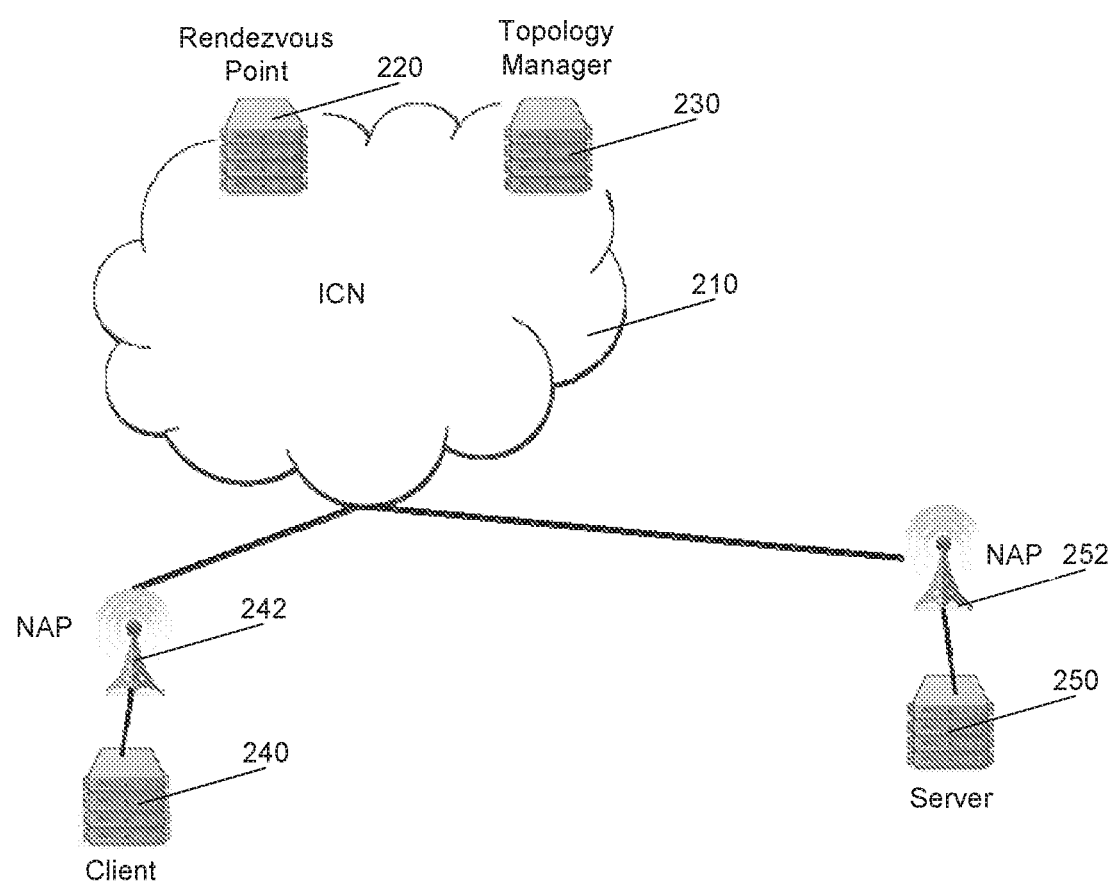
FIG. 2 is a diagram illustrating a Hypertext Transfer Protocol/Internet Protocol-over information-centric network (HTTP/IP-over-ICN) network with a Network Attachment Point (NAP)-based protocol mapping.

Referring now to FIG. 2, a diagram illustrating an HTTP/IP-over-ICN network 210 with a Network Attachment Point (NAP)-based protocol mapping is shown. IP-based applications may provide a broad range of Internet services. Transitioning these applications may require more than a pure transition of network-level functionality (e.g., protocol stack implementation) in the WTRU since such a transition may also require the transition of server-side components (e.g., e-shopping web-servers). Accordingly, IP-based services, and IP-based WTRUs, may continue to exist.

In order for ICN and HTTP/IP based services to coexist, there may be a gateway-based architecture where one or more NAPs translate IP and HTTP-level protocol abstractions of the Internet in ICN-compliant operations. As shown in FIG. 2, a gateway-based architecture may be used for intra-network communication. Border gateways may be used to communicate with IP devices in peer networks.

The ICN network 210 may include a client 240 and a server 250. The client 240 may be an IP-enabled device, such as, for example, the WTRU 102 or the computing device 101 described above. The server 250 may be similar to the server 117 described above. The client 240 may be coupled to the ICN network 210 by a first NAP 242. The server 250 may be coupled to the ICN network 210 by a second NAP 252. It should be noted that although the client 240 and the first NAP 242 are shown as separate entities in FIG. 2, the two entities may be combined into a single WTRU 102 or computing device 101. In addition, although the server 250 and the second NAP 252 are shown as separate entities in FIG. 2, the two entities may be combined into a single server 117. The client 240 may also locally host content.

The ICN network 210 may also include a rendezvous point (RVZ) 220 that allows for matching an HTTP client with a suitable server and a topology manager (TM) 230 that allows for creating a suitable forwarding path from the client 240 to the chosen server. The RVZ 220 may identify a needed communication between sender and receiver and the TM 230 may compute suitable forwarding information to deliver the packet from the sender to the receiver. It should be noted that the RVZ 220 and the TM 230 are shown as two logical functions, but may be implemented as a single component that combines the functions of the RVZ 220 and TM 230.

The ICN network 210 may provide the ability to send responses to the same HTTP requests sent by different clients in the network as a so-called ad-hoc multicast. The NAPs at which these different clients are located may be determined and a single multicast response may be sent to all of the NAPs. The NAPs may then in turn send a unicast response to attached clients that originally requested the response. In an example, several clients may issue HTTP-level requests for video segments of a popular movie, located at the server 250. These requests may be time-synchronized in that the requests arrive at the NAP 252 at roughly the same time (e.g. within a usual server response time). The server 250 may generate responses to the requests forwarded by the NAP 252. Upon arrival of the first response, the NAP 252 may generate a single multicast response to all the NAPs at which the originating clients are located. Responses to the requests arriving after the multicast response that has been sent will be dropped to avoid duplication. The multicast response may arrive at all of the NAPs included in the response. These NAPs may restore the unicast HTTP response included in the multicast response and relay the unicast HTTP response to the originating client. A mapping of requests to responses may be maintained at the client's NAP.

Instead of having a single client requesting an HTTP-level resource, a NAP may be connected to two or more clients requesting the same resource (e.g., two or more family members watching the same video in different parts of the house). In this case, several response copies may be created upon the arrival of the multicast response from the ICN network. However, these local copies may be sent via link-local unicast messages to each outstanding client. Multicast at the link-local level may not be utilized if the NAP preserves the original unicast semantic towards the local client for reasons of backward compatibility.

It may be desirable to utilize multicast capabilities on the link-local network for instances when multiple requesters are waiting for the same response. This may preserve link-local resources and the overall network capacity may be increased.

Responses may be delivered to a specific HTTP request as a multicast response to specific clients (e.g. WTRUs) that have previously requested the response. A standard link-local IP multicast message may be used, for example, by relaying the responses over a known multicast address. However, several constraints may need to be considered to implement an efficient process. For example, it may be desirable to minimize load on the link-local router (e.g., the Customer Premise Equipment (CPE) and on the physical link between the router and its endpoints. The load on the link-local router should be reduced as compared to a full unicast load (FUL) of n responses to be sent if there are n outstanding requests. In addition, it may be desirable to minimize the load on the individual client (e.g., the user's terminal). The load should be reduced as compared to the full multicast load (FML) of needing to receive any response, even if none of the responses are destined for the user terminal. In addition, it may be desirable to utilize Ethernet/Layer 2 level filtering mechanisms at the individual client. This may be achieved by using individual IP multicast addresses mapped onto suitable address (e.g., Ethernet MAC addresses).

Considering these constraints, the standard link-local IP multicast method may not be desirable. If the CPE were to relay any HTTP-level response having more than one respondent to a well-known IP multicast address, any client in need of receiving the response may need to receive the relayed message, extract the payload, and inspect the necessary HTTP header fields in order to determine whether or not the message was intended for the client. This may minimize the CPE load, but it may also create a significant overhead on each client. For example, each client, even if that client does not have any outstanding requests, may need to receive the message and inspect it at layer 7 (i.e., HTTP header fields).

Accordingly, it may be desirable to apply one or more of the following concepts to ensure efficient delivery of link-local multicast HTTP responses.

Figure 3:
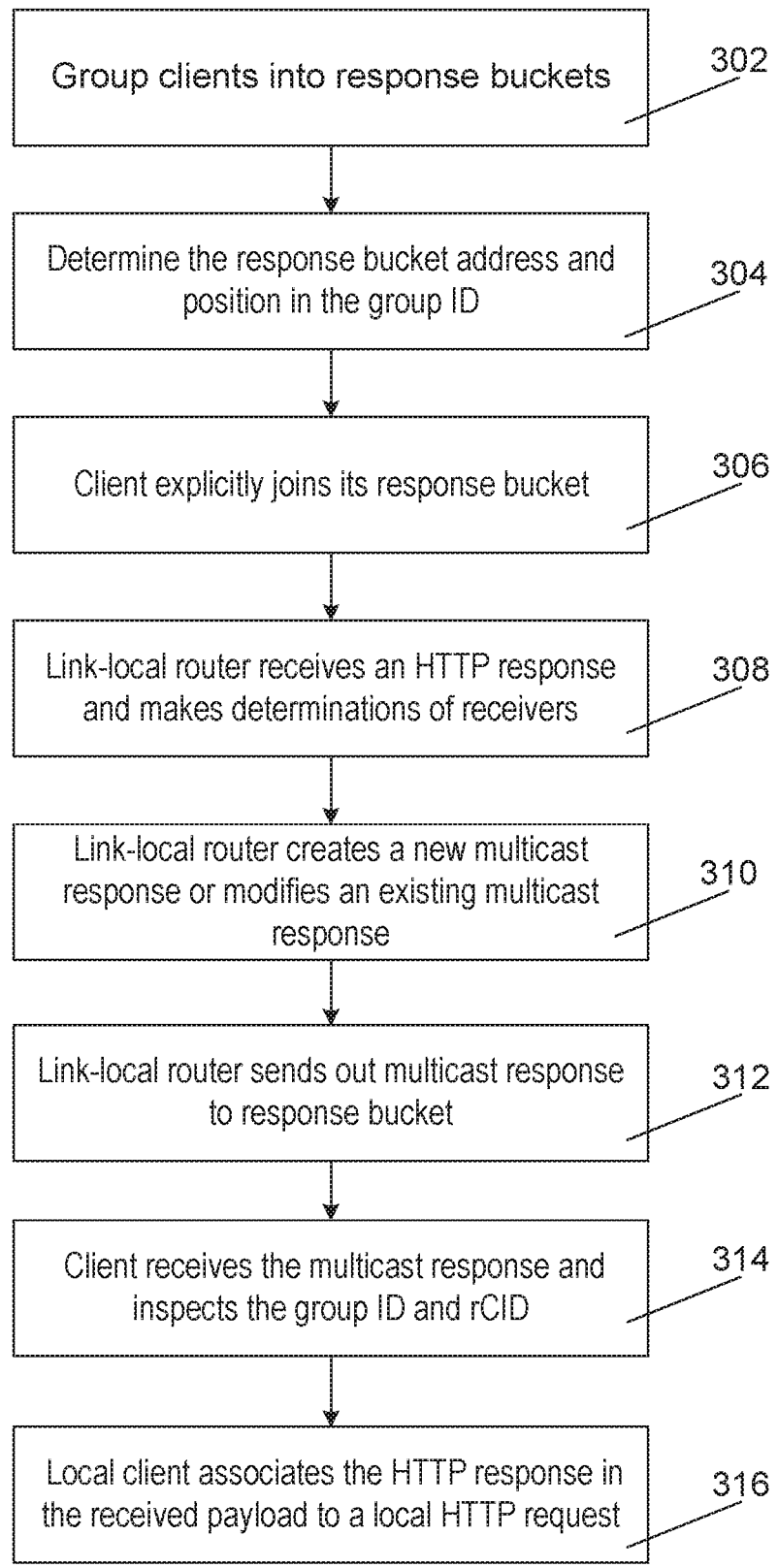
FIG. 3 is a flow chart showing a method of efficient delivery of link-local multicast HTTP responses.

Referring now to FIG. 3, a flow chart showing a method of efficient delivery of link-local multicast HTTP responses is shown. In step 302, a one or more clients may be grouped into buckets of receivers by a link-local router (e.g., a NAP). In an example, the buckets may be of different sizes. In another example, each of the buckets may be of a size N. Each of the buckets may have a bucket address. When using IP multicast, the bucket address may be an IP multicast address. One or more of the clients may have pre-selected one or more response groups (i.e., bucket addresses). This may allow the NAP to create IP multicast packets to one or more clients in its subnet. Clients may keep a mapping of opened port numbers by HTTP applications and an URL of the HTTP session in order to determine a reverse content identifier (rCID) which may have a format of "/http/hash (url)."

A content identifier (CID) may be used in an ICN-based network to match publishers and subscribers. In an HTTP-over-ICN scenario, the FQDN may be the CID when a client NAP (cNAP) publishes an HTTP request to a server NAP (sNAP). A uniform resource identifier (URI) may be the rCID when the sNAP publishes an HTTP response to the cNAP. A response sent to a response group may include a list of clients which are supposed to receive the packet as well as the original response as a payload.

It should be noted that even though a particular client may be in the same bucket as another client awaiting an HTTP response, it does not necessarily mean the particular client has an application that is awaiting an HTTP response. Accordingly, a dedicated group ID may be used. The group ID may be defined as a bit-field of size X in an IP header, where each bit-position describes the group membership of a specific receiver that allows a client to determine whether or not it should accept the incoming packet.

In step 304, the client may determine the response group bucket address and the client's position in the group ID by the unicast address assigned to the client. Additional signaling between the client and the NAP may be provided to agree upon the bucket size at the local network.

In step 306, the client may explicitly join its response bucket after it determines the group address. The client may join the response bucket using Internet Group Management Protocol (IGMP) to enable IP multicast packet reception by its local network interface. The client may join its response bucket towards the link-local router using one or more IGMP messages. This may enable compatibility with existing IP clients. This may also allow configuration of client-local layer 2 filtering mechanisms, such as setting an appropriate Ethernet multicast address for the response bucket in order to receive any message at the IP (multicast) layer. If the client does not explicit join the response bucket, the client may not be negatively affected in receiving any HTTP multicast responses beyond the layer 2 filtering mechanism of standard network adapters as the NAP may be aware which clients have joined a response bucket. If a client did not join a response bucket, the NAP may ensure that the HTTP response is delivered via unicast to the client.

In step 308, the link-local router may receive an HTTP response and may determine one or more of the following. The link-local router may determine if at least one local receiver is waiting for a response to a previously issued HTTP request. The link-local router may determine the response bucket and group ID of the at least one local receiver. The link-local router may determine if the at least one local receiver has joined the response bucket.

In step 310, the link-local router may create a new multicast response, or it may modify an existing multicast response (e.g., if a first HTTP response packet is still outstanding). The multicast response may be generated or modified for the specific response bucket to which the receiver belongs. The link-local router may indicate in the group ID that a receiver is to extract the response. The link-local router will repeat this process for all outstanding receivers of the HTTP response.

In step 312, the link-local router will send out the multicast responses to respective multicast response group addresses. It should be noted that there may be multiple IP multicast addresses based on the assigned IP address of the client.

In step 314, the local client may receive the multicast response and may inspect the group ID and the rCID.

In step 316, if the group ID indicates reception by the local client, it may associate the HTTP response in the received payload to a local HTTP request. The local client may then forward the response to the appropriate internal application for further processing using the previously created rCID to socket mapping.

This process of delivering responses to a specific request as a multicast response to specific clients may be applied to an IPv4 system. For example, a local address of a client may be a unicast address of 192.168.x.y. In this example, 256 clients (i.e., N=256) may be assigned to the IPv4 multicast address space $224.0.2.x^2/24$. A local IP client with a local unicast address of 192.168.1.2 may be assigned to the local response group address 224.0.2.1. The local client may consider byte 2 (i.e., the class D part of its unicast address) as an indication of a response it is destined to receive.

As indicated above, the local receiver may join a response bucket using standard IGMP messages to enable backward compatibility. With this, it may also be possible to implement specific triggers for receiving HTTP multicast responses. For example, a trigger may be the execution of applications where HTTP multicast responses are likely to occur, such as video clients that might incur parallel viewing behavior in the same local network. This also means that clients may decide to not participate in such logic and therefore preserve resources to execute the procedure necessary to receive packets on the multicast response group. Hence, the client may issue an IGMP join message for the IP multicast address 224.0.2.1.

Figure 4:
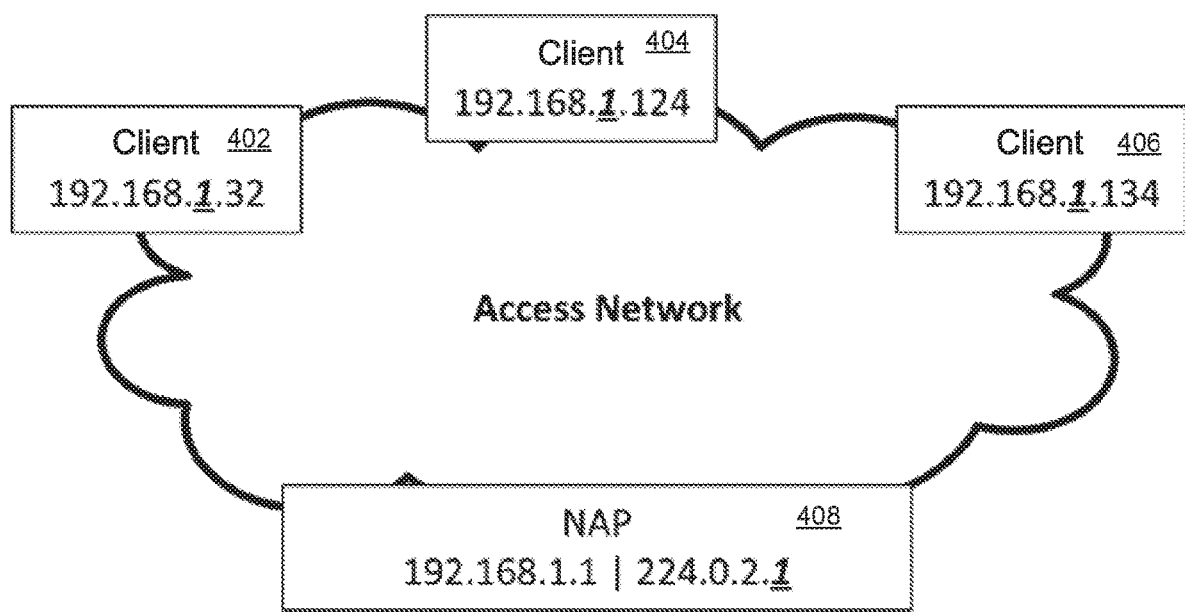
FIG. 4 is a diagram illustrating a determination of an IP multicast address is shown.

Referring now to FIG. 4, a diagram illustrating a determination of an IP multicast address is shown. A first client 402, a second client 404, and a third client 406 may be from a network with an address 192.168.1.0/24 may be attached at a NAP 408. The Class C octet "1" may become the Class D octet in an IP multicast address (224.0.2.1) used to send IP multicast packets to the first client 402, the second client 404, and the third client 406.

If IGMP is the signaling protocol used to join a multicast group, intermediate switches and link-local interfaces may become aware of the intention of sending IP multicast messages from the NAP to the clients, and no further extension may be needed. For example, in fixed-line access networks using asymmetric digital subscriber line (ADSL), the access network depicted in FIG. 4 may be a Broadband Remote Access Server (BRAS) deployment with several digital subscriber line access multiplexers (DSLAMs) with attached CPEs. In these deployment scenarios, IGMP may be widely supported across Internet service providers (ISPs) to create the multicast trees and the required port forwarding states in the BRAS and DSLAM network elements. The proposed methods and procedures elaborate on this and may transparently allow ad-hoc multicast delivery of HTTP responses over conventional BRAS deployments.

A NAP may receive an HTTP response to an HTTP request that has been issued by one or more link-local clients. The NAP may execute step 308 of FIG. 3, the link-local router may determine the link-local IP addresses of clients with outstanding requests to the response. For this, the link-local router may maintain a mapping of a source address to a unique request identifier to determine clients. For example, the URL and the proxy rule identifier may provide a unique request/response mapping across a range of HTTP header options. After checking if the clients have explicitly joined the scheme, the NAP may determine the appropriate multicast response bucket (e.g., the IP multicast address), insert the client into the client ID of the bucket, and copy the response. If the client has not joined the scheme on time, for example, if the client did not send the HTTP request before the HTTP response arrived at the router, the router may send the response to the outstanding client that arrived too late as an individual unicast message.

Figure 5:
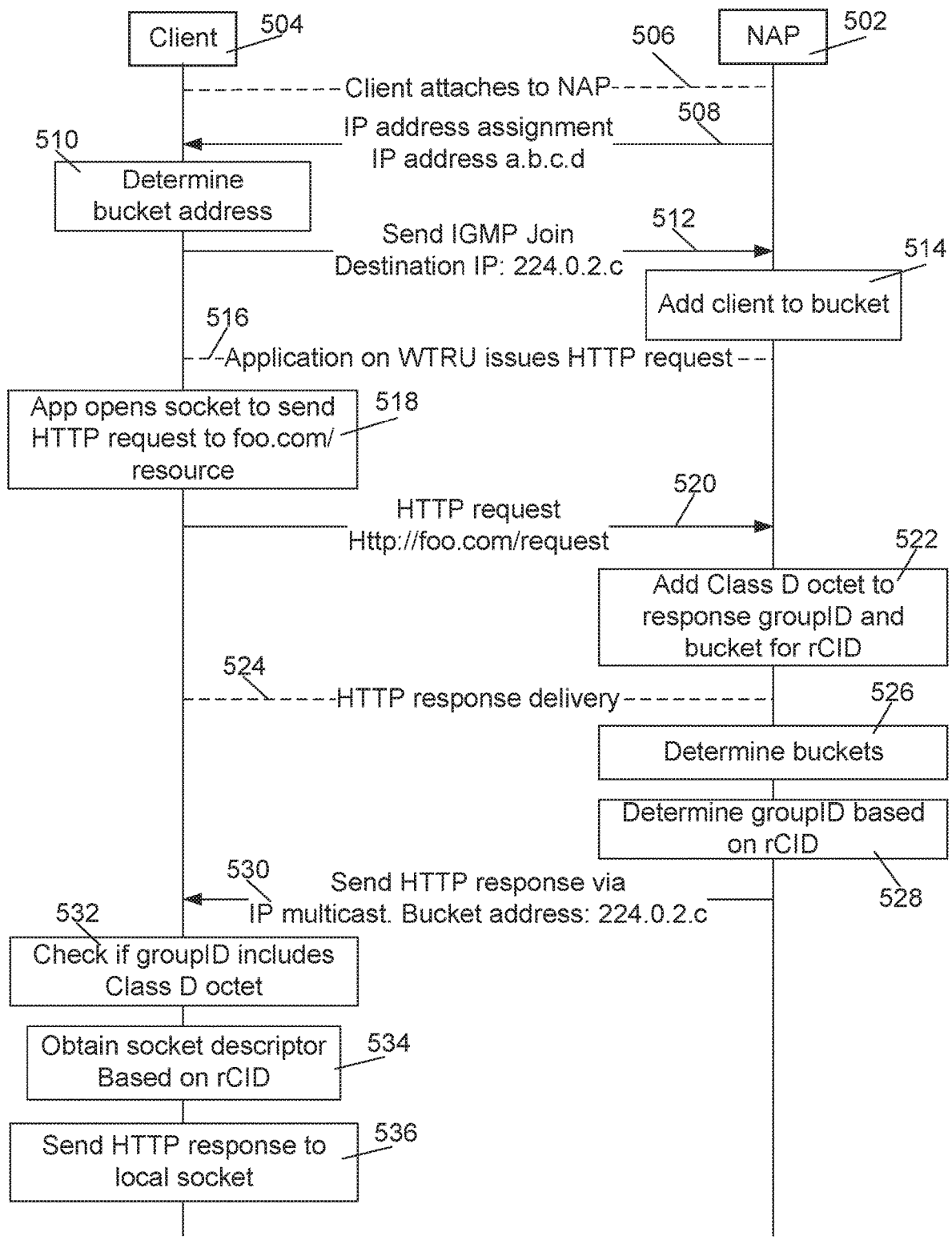
FIG. 5 is a flowchart illustrating a method of a NAP providing multicast delivery of HTTP responses.

Referring now to FIG. 5, a flowchart illustrating a method of a NAP 502 providing multicast delivery of HTTP responses is shown. FIG. 5 illustrates the delivery of a received HTTP response to a bucket of clients. As described above, a client 504 may be connected to the NAP 502 via an interface, or the client 504 and the NAP 502 may be a single entity.

Starting at step 506, the client 504 may attach to the NAP 502. In step 508, the client 504 may receive an IP address assignment (e.g., a.b.c.d) from the NAP 502. In step 510, the client may determine an IP multicast address (i.e. bucket) to be grouped into. In step 512, the client 504 may send an IGMP message to the NAP 502 to join a destination IP multicast address (e.g., 224.0.2.C). In step 514, the NAP 502 may add the client 504 to the bucket.

Starting at step 516, an application on the client 504 may issue an HTTP request. In step 518, the application opens a socket to send the HTTP to a FQDN (e.g., foo.com/resource). In step 520, the client 504 sends the HTTP request to the NAP 502. The HTTP request may include an rCID. In step 522, the NAP 502 may add the class D octet from the IP address of the client 504 to a response group ID and bucket for that rCID.

Starting at step 524, the NAP 502 may begin HTTP response delivery. In step 526, the NAP may determine how many clients are awaiting the HTTP response based on the rCID and may determine response buckets (IP multicast addresses). In step 528, the NAP 502 may determine the group ID by setting the respective bit in the group ID bitfield, which is derived from the class D octet of the client's IP address.

In step 530, the NAP 502 may send the HTTP response via IP multicast to the determined response buckets. In step 532, the client 504 may check if its bit is set in the group ID bit field. If so, in step 534, the client 504 may look up socket file descriptors awaiting the HTTP response using the rCID. In step 536, the received HTTP response is sent to awaiting sockets.

It should be noted that the examples described herein may work with anchoring HTTP-level services in ICN networks, they may also work seamlessly in 'normal' IP routed networks where the access router receives more than one unicast response rather than a single multicast response.

The methods described above may also be applied to IPv6 systems. The process of determining the response group bucket and the position in the group ID for individual clients may be adjusted to accommodate for the differences in IP addresses.

Figure 6:
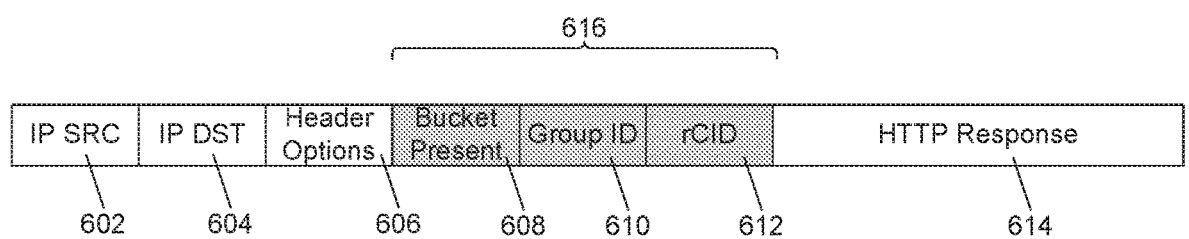
FIG. 6 is a diagram illustrating an IP header for IP multicast with one or more IP header extensions.

Referring now to FIG. 6, a diagram illustrating an IP header 600 for IP multicast with one or more IP header extensions is shown. An IP SRC field 602 may be the link-local router's IP address. An IP DST filed 604 may be the IP multicast address of format 224.0.2.c (Class C byte of clients). The header options field 606 may contain conventional IP header options. An IP header extension 616 may indicate whether or not a bucket transmission is included 608, the group ID 610, and the rCID 612.

Once the IP header extensions are used to determine the response bucket and the position in the group IP for individual clients, the process described above with reference to FIG. 3 may continue with step 306, and the client may explicitly join its response bucket after it determines the group address. The remaining steps may be performed as described above.

With the 8 bit nature of class address in IPv4 systems, a natural alignment of bucket sizes may lead to a maximum of 253 receivers in a response group. However, the size of the buckets may not be fixed. The size of buckets may be an aspect of local optimization. For example, larger bucket sizes, which may result in fewer response groups, may reduce router load due because fewer responses may need to be locally relayed. On the other hand, smaller bucket sizes may reduce the size of the list of client ID pairs communicated in the multicast response, which may reduce messaging overhead. However, as a tradeoff, more multicast responses may need to be sent over the link-local link.

Bucket size may be conveyed by the IP assignment method supervised by the NAP. The NAP may embed necessary signaling into existing link-local announcement protocols such as DHCP or router advertisement messages. New DHCP options may be included in responses to clients.

Bucket size may be adjusted throughout the lifetime of the connection between the link-local router and the clients. Statistics at the link-local router may be used for the adjustment of bucket size. For example, if the link-local router determines a group of receivers is joining a multicast response scheme, it may cluster these receivers in a particular address range. This may be done by reissuing new IP address leases to those clients and adjusting the bucket size to approximately the number of the receivers. Four bits may be used to capture approximately 10 receivers.

A router may be deployed to serve a large number of clients and the router may be configured to use jumbo frames. The bucket size may be steadily increased from an initial starting value, which may already be larger than the originally proposed 256 bits. Responses may be sent to several thousand clients at the same time. After the number of clients decreases (e.g., attendance at a large scale event diminishes), the values may be re-adjusted by the router. The router may adjust the size of the buckets by issuing new router advertisements or DHCP responses to new IP address leases. The router may reduce the bucket size to smaller values to reduce the group ID size in each packet.

The link-local router may be an eNB and the client may be a WTRU using 3GPP technology. Evolved Multimedia Broadcast Multicast Services (eMBMS) may be used to deliver responses in a multicast fashion. In this scenario, the procedure may be similar as those described above with respect to FIG. 3. However, it should be noted that the underlying physical layer may be configured to allow the delivery of a packet via broadcast. The IPv4 and IPv6 protocols may still apply, and the WTRUs may need to signal their ability to join the eMBMS bearer service when announcing their service capabilities. Accordingly, when the link-local router determines that the clients are awaiting an HTTP response, the procedure of FIG. 3 may be followed, but the link-local router may also signal to the underlying physical layer which transport mechanism shall be used to deliver the response. In the case of eMBMS, the various bucket addresses (i.e., IP multicast address) may be mapped onto the same eMBMS resource channel, which each WTRU may have joined. The standard eMBMS signaling may be used between the NAP (i.e., the eNB) and WTRUs that participate in the scheme described above. An operator may decide to assign a specific (well-known) eMBMS resource to the proposed bucket-based delivery scheme. Participating WTRUs may join this specific eMBMS resource.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a first network access point (NAP), the method comprising:
    assigning an Internet Protocol (IP) address to a client that is connected to the first NAP;
    receiving a message from the client to join a multicast address, wherein the multicast address is associated with a response bucket, wherein the response bucket comprises a group of clients connected to the first NAP, wherein a class D octet in the multicast address is a class C octet of the client's IP address;
    receiving a Hypertext Transfer Protocol (HTTP) request from the client;
    sending the HTTP request to a second NAP, wherein the HTTP request comprises a content identifier (CID);
    receiving an HTTP response from the second NAP, wherein the HTTP response comprises a reverse CID (rCID); and
    sending a multicast response comprising the HTTP response to the multicast address, wherein the multicast response includes a group identification (ID) field in an IP header, wherein the group ID field indicates that a specific client is to extract the HTTP response, wherein the group ID field in the IP header comprises a number of bits, wherein a bit position of the number of bits indicates a group membership of the specific client.

2. The method of claim 1, further comprising determining, based on at least the rCID, that the client and one or more of the group of clients are awaiting the HTTP response.

3. The method of claim 1, wherein the CID comprises a fully qualified domain name (FQDN) hosting content in the HTTP request.

4. The method of claim 1, wherein the rCID comprises a uniform resource identifier (URI).

5. The method of claim 1, wherein the rCID has a format of /http/hash(url).

6. The method of claim 1, wherein the group ID field is derived from the class D octet of the client's IP address.

7. The method of claim 1, further comprising negotiating with the client on a size of the response bucket.

8. The method of claim 1, wherein the IP header further comprises an indication that the multicast response is included in the rCID.

9. The method of claim 1, further comprising sending a size of the response bucket to the client in an IP assignment message.

10. The method of claim 1, further comprising:
    determining that a second client is awaiting the HTTP response, and did not join the multicast address associated with the response bucket; and
    sending the HTTP response in a unicast message to an IP address of the second client.

11. A network access point (NAP) comprising:
    an antenna;
    a transceiver operatively coupled to the antenna; and
    a processor operatively coupled to the transceiver; wherein:
    the processor is configured to assign an Internet Protocol (IP) address to a client that is connected to the NAP;
    the antenna and the transceiver are configured to receive a message from the client to join a multicast address, wherein the multicast address is associated with a response bucket, wherein the response bucket comprises a group of clients connected to the NAP, wherein a class D octet in the multicast address is a class C octet of the client's IP address;
    the antenna and the transceiver are further configured to receive a Hypertext Transfer Protocol (HTTP) request from the client;
    the antenna and the transceiver are further configured to send the HTTP request to a second NAP, wherein the HTTP request comprises a content identifier (CID);
    the antenna and the transceiver are further configured to receive an HTTP response from the second NAP, wherein the HTTP response comprises a reverse CID (rCID); and
    the antenna and the transceiver further are configured to send a multicast response comprising the HTTP response to the multicast address, wherein the multicast response includes a group identification (ID) field in an IP header, wherein the group ID field indicates that a specific client is to extract the HTTP response, wherein the group ID field in the IP header comprises a number of bits, wherein a bit position of the number of bits indicates a group membership of the specific client.

12. The NAP of claim 11, wherein the processor is further configured to determine, based on at least the rCID, that the client and one or more of the group of clients are awaiting the HTTP response.

13. The NAP of claim 11, wherein the CID comprises a fully qualified domain name (FQDN) hosting content in the HTTP request.

14. The NAP of claim 11, wherein the rCID comprises a uniform resource identifier (URI).

15. The NAP of claim 11, wherein the rCID has a format of /http/hash(url).

16. The NAP of claim 11, wherein the group ID field is derived from the class D octet of the client's IP address.

17. The NAP of claim 11, wherein the client and the NAP negotiate on a size of the response bucket.

18. The NAP of claim 11, wherein the IP header further comprises an indication that the multicast response is included in the rCID.

19. The NAP of claim 11, wherein the antenna and the transceiver are further configured to send a size of the response bucket to the client in an IP assignment message.

20. The NAP of claim 11, wherein the processor is further configured to determine that a second client is awaiting the HTTP response, and did not join the multicast address associated with the response bucket, and the antenna and the transceiver are further configured to send the HTTP response in a unicast message to an IP address of the second client.

* * * * *